US011497060B2

(12) United States Patent
Kunt et al.

(10) Patent No.: US 11,497,060 B2
(45) Date of Patent: Nov. 8, 2022

(54) MULTIPLEXING, ADDRESSING AND HARQ FOR MSGB IN TWO-STEP RACH IN MOBILE COMMUNICATIONS

(71) Applicant: MediaTek Singapore Pte. Ltd., Singapore (SG)

(72) Inventors: Mehmet Kunt, Cambridge (GB); Pradeep Jose, Cambridge (GB); Pavan Santhana Krishna Nuggehalli, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/587,353

(22) Filed: Sep. 30, 2019

(65) Prior Publication Data

US 2020/0107371 A1 Apr. 2, 2020

Related U.S. Application Data

(60) Provisional application No. 62/739,376, filed on Oct. 1, 2018.

(51) Int. Cl.
*H04W 74/08* (2009.01)
*H04L 1/18* (2006.01)
(Continued)

(52) U.S. Cl.
CPC ....... *H04W 74/0833* (2013.01); *H04L 1/1819* (2013.01); *H04L 5/0055* (2013.01);
(Continued)

(58) Field of Classification Search
None
See application file for complete search history.

(56) References Cited

U.S. PATENT DOCUMENTS

2015/0312938 A1* 10/2015 Larmo ............... H04W 74/006
370/329
2018/0020487 A1* 1/2018 Tsai ................... H04W 74/004
(Continued)

FOREIGN PATENT DOCUMENTS

CN 107872899 A 4/2018
CN 108282899 A 7/2018
(Continued)

OTHER PUBLICATIONS

China National Intellectual Property Administration, International Search Report and Written Opinion tor PCT/CN2019/109930, Jan. 6, 2020.
(Continued)

*Primary Examiner* — Ayanah S George
(74) *Attorney, Agent, or Firm* — Han IP PLLC; Andy M. Han

(57) ABSTRACT

Various examples and schemes pertaining to multiplexing, addressing and HARQ for MsgB in two-step RACH in mobile communications are described. An apparatus implemented in a user equipment (UE) transmits to a network node of a wireless network a first message containing a preamble index and data. In response, the apparatus receives from the network node a second message containing a random access response (RAR) and contention resolution information. The second message is addressed to either a cell radio network temporary identifier (C-RNTI) of the UE or a random access radio network temporary identifier (RA-RNTI).

16 Claims, 13 Drawing Sheets

(51) Int. Cl.
*H04L 5/00* (2006.01)
*H04W 24/08* (2009.01)
*H04W 72/04* (2009.01)
*H04W 76/11* (2018.01)
*H04W 76/27* (2018.01)

(52) U.S. Cl.
CPC ......... *H04W 24/08* (2013.01); *H04W 72/042* (2013.01); *H04W 76/11* (2018.02); *H04W 76/27* (2018.02)

(56) References Cited

U.S. PATENT DOCUMENTS

| | | |
|---|---|---|
| 2018/0124822 A1 | 5/2018 | Wang et al. |
| 2019/0069258 A1* | 2/2019 | Jeon ....................... H04W 48/20 |
| 2019/0350004 A1* | 11/2019 | Zhao ................. H04W 74/0833 |

FOREIGN PATENT DOCUMENTS

| | | | |
|---|---|---|---|
| CN | 108282903 A | 7/2018 | |
| CN | 108289329 A | 7/2018 | |
| WO | WO-2018175809 A1 * | 9/2018 | ........ H04W 74/0833 |
| WO | WO 2018175809 A1 | 9/2018 | |

OTHER PUBLICATIONS

Mediatek Inc., Further considerations on 2-step RACH, 3GPP TSG-RAN WG2 Meeting #103bis, R2-1813965, Chengdu, China, Oct. 8 -12, 2018.

Mediatek Inc., 2-step RACH msgB addressing and HARQ, 3GPP TSG-RAN WG2 Meeting #104, R2-1816687, Spokane, USA, Nov. 12-16, 2018.

Taiwan Intellectual Property Office, Office Action for Taiwan Patent Application No. 108135478, dated Nov. 10, 2020.

* cited by examiner

1200

TRANSMIT, BY A PROCESSOR OF AN APPARATUS
IMPLEMENTED IN A USER EQUIPMENT (UE), TO A NETWORK
NODE OF A WIRELESS NETWORK A FIRST MESSAGE
CONTAINING A PREAMBLE INDEX AND DATA
1210

RECEIVE, BY THE PROCESSOR RESPONSIVE TO
TRANSMITTING THE FIRST MESSAGE, FROM THE NETWORK
NODE A SECOND MESSAGE CONTAINING A RANDOM ACCESS
RESPONSE (RAR) AND CONTENTION RESOLUTION
INFORMATION

- THE SECOND MESSAGE IS ADDRESSED TO A CELL RADIO
  NETWORK TEMPORARY IDENTIFIER (C-RNTI) OF THE UE
  RESPONSIVE TO BOTH THE C-RNTI BEING INDICATED IN
  THE FIRST MESSAGE AND THE SECOND MESSAGE BEING
  TRANSMITTED TO THE UE AND NO OTHER UE

- THE SECOND MESSAGE IS ADDRESSED TO A RANDOM
  ACCESS RADIO NETWORK TEMPORARY IDENTIFIER (RA-
  RNTI) RESPONSIVE TO EITHER THE C-RNTI BEING
  ABSENT IN THE FIRST MESSAGE OR THE SECOND
  MESSAGE BEING TRANSMITTED TO THE UE AND ONE OR
  MORE OTHER UES

MULTIPLEXING, ADDRESSING AND HARQ FOR MSGB IN TWO-STEP RACH IN MOBILE COMMUNICATIONS

CROSS REFERENCE TO RELATED PATENT APPLICATION(S)

The present disclosure is part of a non-provisional application claiming the priority benefit of U.S. Patent Application No. 62/739,376, filed on 1 Oct. 2018, the content of which being incorporated by reference in its entirety.

TECHNICAL FIELD

The present disclosure is generally related to wireless communications and, more particularly, to techniques pertaining to multiplexing, addressing and hybrid automatic repeat request (HARQ) for MsgB in two-step random access channel (RACH) in mobile communications.

BACKGROUND

Unless otherwise indicated herein, approaches described in this section are not prior art to the claims listed below and are not admitted as prior art by inclusion in this section.

In the $3^{rd}$ Generation Partnership Project (3GPP), a two-step RACH is currently being developed to reduce the number of messaging steps compared to the legacy four-step RACH. FIG. 13 illustrates a legacy four-step RACH and a two-step RACH. Referring to FIG. 13, in the four-step RACH, the second message (Msg2) is addressed to random access radio network temporary identifier (RA-RNTI) and can contain information for more than one user equipment (UE). Additionally, in the four-step RACH, the fourth message (Msg4) can be addressed to temporary cell RNTI (TC-RNTI) or cell RNTI (C-RNTI), depending on the scenario, and is addressed to a single UE. Referring to FIG. 13, the first message and the second message in the two-step RACH are herein referred to as message A (MsgA) and message B (MsgB). In the two-step RACH, MsgB can contain information that was formerly carried in Msg2 and Msg4 in the four-step RACH. There, however, remain some issues to be addressed regarding the two-step RACH. For example, issues such as whether MsgB in the two-step RACH should contain information for a single UE or for multiple UEs, whether MsgB should be addressed to RA-RNTI, C-RNTI or another UE identity, whether hybrid automatic repeat request (HARQ) should be supported for MsgB, and how the HARQ feedback should be transmitted by a UE need to be addressed.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure aims to propose concepts, solutions, schemes, techniques, designs, methods and apparatus pertaining to multiplexing, addressing and HARQ for MsgB in two-step RACH in mobile communications.

In one aspect, a method may involve a processor of an apparatus, implemented in a UE, transmitting to a network node of a wireless network a first message containing a preamble index and data. The method may also involve the processor receiving, responsive to transmitting the first message, from the network node a second message containing a random access response (RAR) and contention resolution information. The second message may be addressed to either a cell radio network temporary identifier (C-RNTI) of the UE or a random access radio network temporary identifier (RA-RNTI).

In one aspect, a method may involve a processor of an apparatus, implemented in a UE, transmitting to a network node of a wireless network a first message containing a preamble index and data. The method may also involve the processor receiving, responsive to transmitting the first message, from the network node a second message containing a RAR and contention resolution information. The second message may be addressed to a C-RNTI of the UE responsive to both the C-RNTI being indicated in the first message and the second message being transmitted to the UE and no other UE. The second message may be addressed to the RA-RNTI responsive to either the C-RNTI being absent in the first message or the second message being transmitted to the UE and one or more other UEs.

In one aspect, an apparatus implementable in a UE may include a transceiver and a processor coupled to the transceiver. The transceiver may be configured to wirelessly communicate with a network node of a wireless network. The processor may be configured to transmit, via the transceiver, to the network node a first message containing a preamble index and data. The processor may be also configured to receive, via the transceiver responsive to transmitting the first message, from the network node a second message containing a RAR and contention resolution information. The second message may be addressed to either a C-RNTI) of the UE or a RA-RNTI.

It is noteworthy that, although description provided herein may be in the context of certain radio access technologies, networks and network topologies such as 5th Generation (5G) and New Radio (NR), the proposed concepts, schemes and any variation(s)/derivative(s) thereof may be implemented in, for and by other types of radio access technologies, networks and network topologies such as, for example and without limitation, Long-Term Evolution (LTE), LTE-Advanced, LTE-Advanced Pro, narrowband (NB), narrowband Internet of Things (NB-IoT) and any future-developed networks and technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 12 is a flowchart of an example process in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

OVERVIEW

Implementations in accordance with the present disclosure relate to various techniques, methods, schemes and/or solutions pertaining to multiplexing, addressing and HARQ for MsgB in two-step RACH in mobile communications. According to the present disclosure, a number of possible solutions may be implemented separately or jointly. That is, although these possible solutions may be described below separately, two or more of these possible solutions may be implemented in one combination or another.

Figure 1:
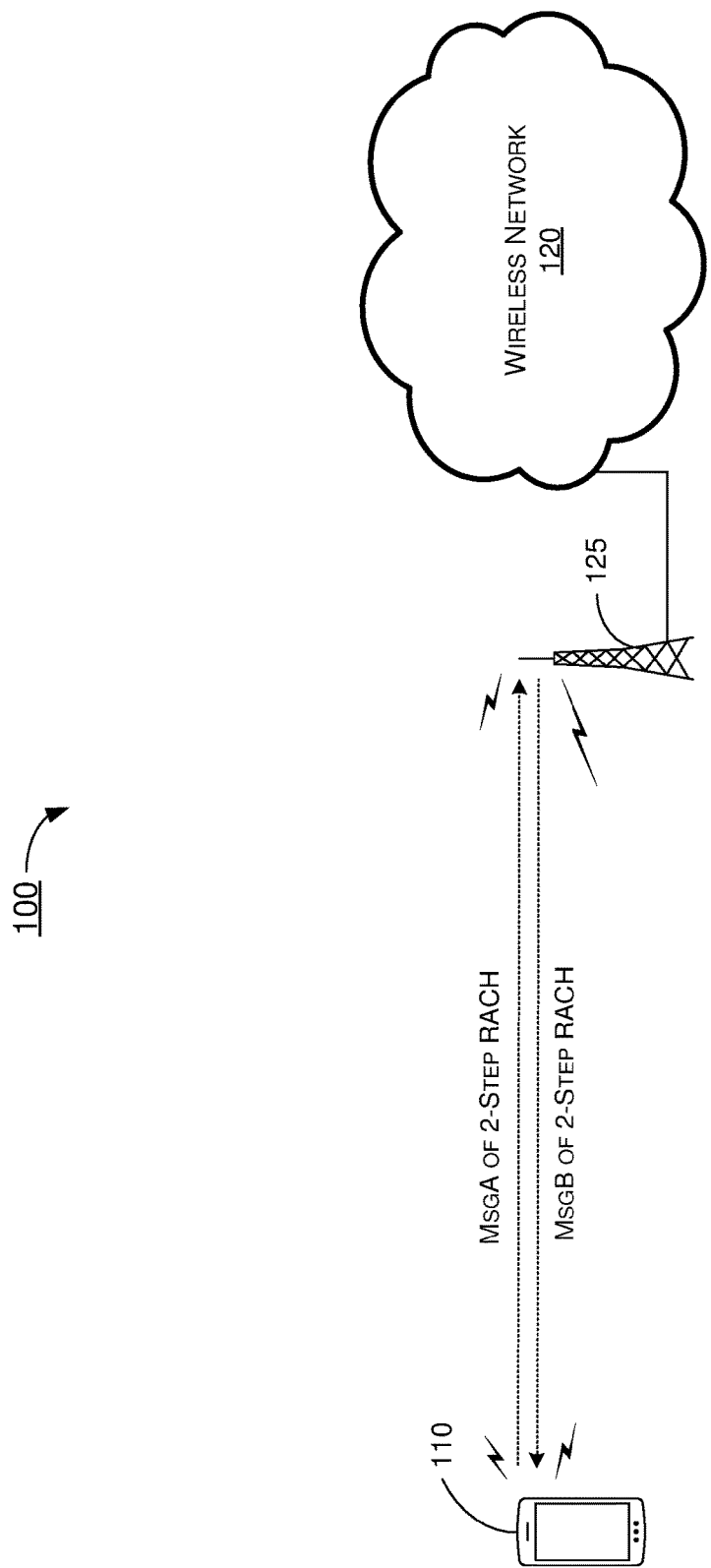
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2-FIG. 9 illustrates example scenarios 200, 300, 400, 500, 600, 700, 800 and 900 in accordance with implementations of the present disclosure. Each of scenarios 200, 300, 400, 500, 600, 700, 800 and 900 may be implemented in network environment 100. The following description of various proposed schemes is provided with reference to FIG. 1-FIG. 9.

Referring to FIG. 1, network environment 100 may be an NR communication environment involving a UE 110 and a wireless network 120. Wireless network 120 may be in wireless communication with UE 110 via a base station 125 (e.g., an eNB, gNB or transmit/receive point (TRP)). UE 110 may be in or a part of, for example and without limitation, a portable apparatus (e.g., smartphone), a vehicle or a component thereof, a roadside unit (RSU) (e.g., a traffic signal, a street lamp, a roadside sensor or a roadside structure) or an Internet of Thing (IoT) device (e.g., a sensor). In network environment 100, UE 110 and wireless network 120 (via base station 125) may implement various schemes pertaining to multiplexing, addressing and HARQ for MsgB in two-step RACH in mobile communications in accordance with the present disclosure, as described below.

Under a proposed scheme in accordance with the present disclosure, in a two-step RACH, MsgB may contain information for a single UE (e.g., UE 110), similar to Msg4 in the four-step RACH. Under the proposed scheme, MsgB may be addressed to C-RNTI in an event that C-RNTI was available at the start of the RA procedure (e.g., a C-RNTI medium access control (MAC) control element (CE) was included in MsgA). Otherwise, in an event that C-RNTI was not available, UE 110 may select a random temporary UE identifier (herein referred to as "TU-RNTI"). Under the proposed scheme, the TU-RNTI may be selected from a reserved pool and UE 110 may indicate the TU-RNTI with MsgA. In such cases, MsgB may be addressed to TU-RNTI.

Figure 2:
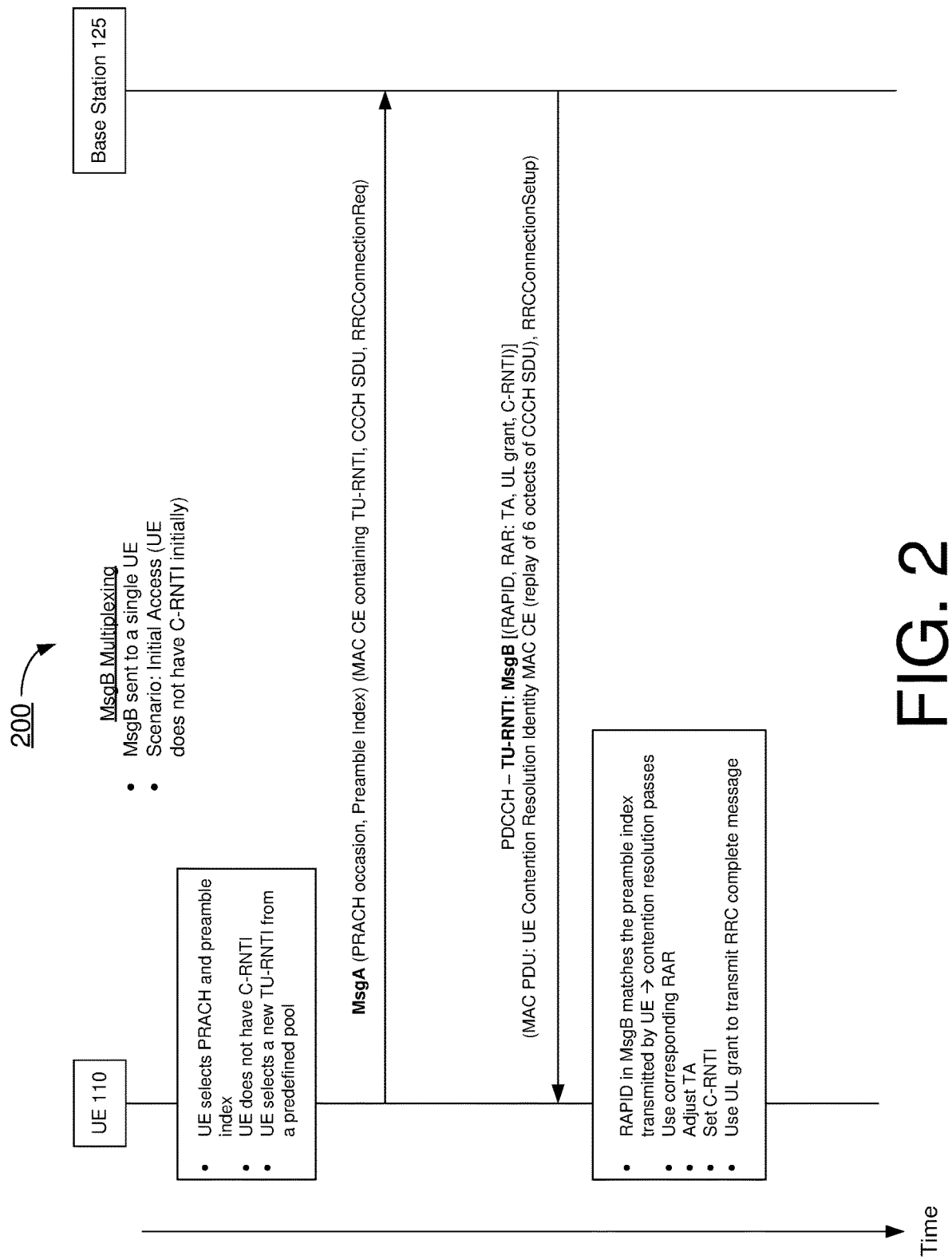
FIG. 2 is a diagram depicting an example scenario in accordance with an implementation of the present disclosure.

Referring to FIG. 2, scenario 200 pertains to MsgB multiplexing in that MsgB is sent to a single UE (e.g., UE 110). Moreover, scenario 200 is a scenario of initial access as UE 110 does not have C-RNTI initially. As shown in FIG. 2, in a two-step RACH under a proposed scheme, UE 110 may select a physical random access channel (PRACH) and a preamble index and, as UE 110 does not have C-RNTI, UE 110 may select a new temporary UE RNTI (TU-RNTI) from a predefined or preconfigured pool. UE 110 may then transmit a MsgA to base station 125. MsgA may contain the TU-RNTI in a MAC CE. In response, base station 125 may transmit a MsgB to UE 110 with the MsgB addressed to the TU-RNTI. MsgB may contain a random access preamble ID (RAPID) that matches the preamble index transmitted by UE 110. Thus, contention resolution may pass, and UE 110 may perform certain operations. For instance, UE 110 may adjust tracking area (TA), set C-RNTI, and/or use an uplink (UL) grant to transmit a radio resource control (RRC) complete message. It is noteworthy that, for illustrative purposes and without limitation, some example pieces of information that may be contained in each of MsgA and MsgB are shown in FIG. 2 although less or more information may be carried in MsgA and/or MsgB in various implementations.

Figure 3:
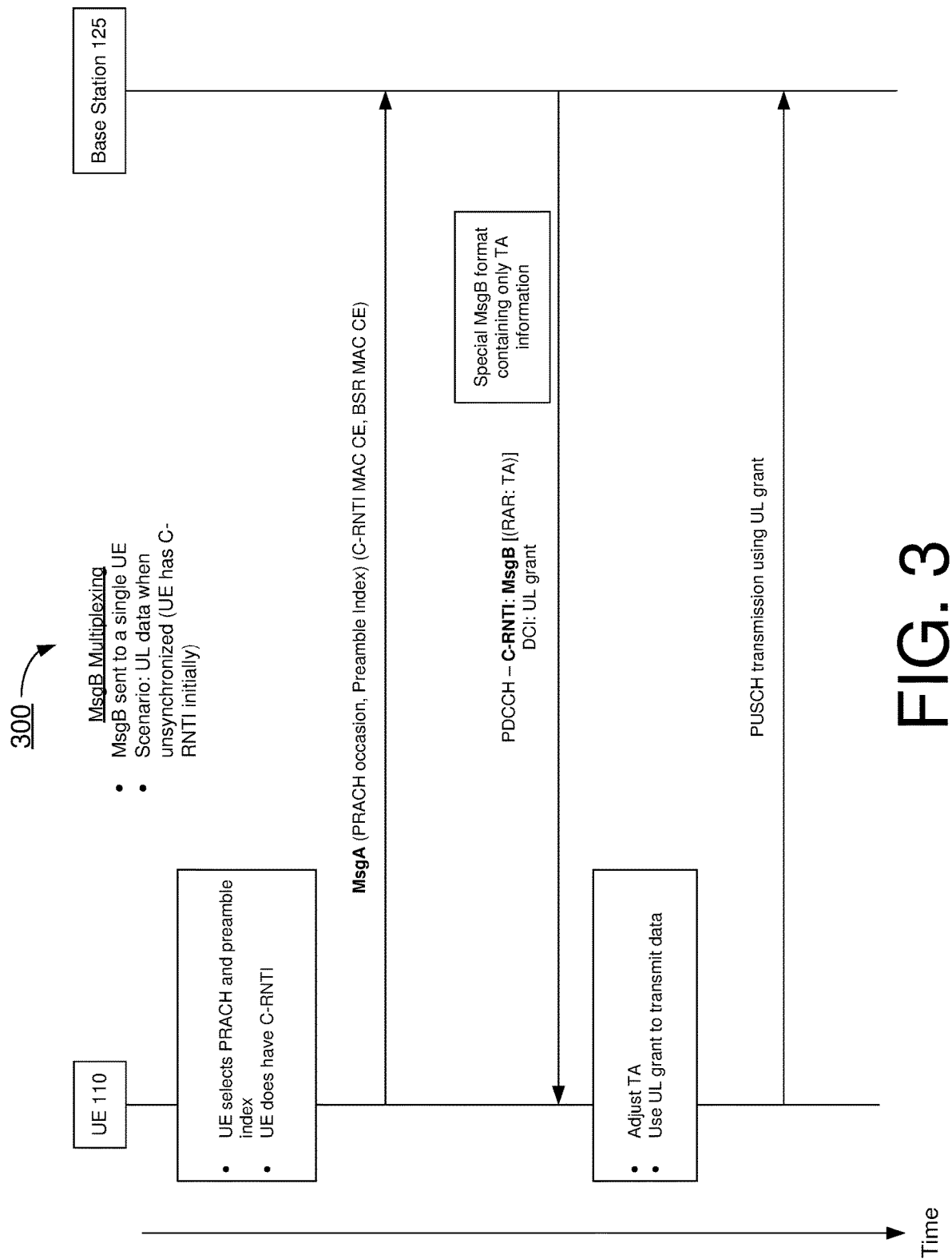
FIG. 3 is a diagram depicting an example scenario in accordance with an implementation of the present disclosure.

Referring to FIG. 3, scenario 300 pertains to MsgB multiplexing in that MsgB is sent to a single UE (e.g., UE 110). Moreover, scenario 300 is a scenario of UL data when unsynchronized with UE 110 having C-RNTI initially. As shown in FIG. 3, in a two-step RACH under a proposed scheme, UE 110 may select a PRACH and a preamble index, and UE 110 does have C-RNTI. UE 110 may then transmit a MsgA to base station 125. MsgA may contain the C-RNTI in a MAC CE. In response, base station 125 may transmit a MsgB to UE 110 with the MsgB addressed to the C-RNTI. MsgB may also contain downlink control information (DCI) indicating an UL grant. As an example, MsgB may have a special MsgB format that contains TA information without other information. Upon receiving MsgB, UE 110 may perform some operations. For instance, UE 110 may adjust TA and/or use the UL grant to transmit data in a physical uplink shared channel (PUSCH). It is noteworthy that, for illustrative purposes and without limitation, some example pieces of information that may be contained in each of MsgA and MsgB are shown in FIG. 3 although less or more information may be carried in MsgA and/or MsgB in various implementations.

Under another proposed scheme in accordance with the present disclosure, in a two-step RACH, MsgB may contain information for multiple UEs (e.g., UE 110 and one or more other UEs), similar to Msg2 in the four-step RACH. Under the proposed scheme, MsgB may be addressed to RA-RNTI. Under the proposed scheme, in an event that the MsgB size becomes excessively large to carry all the information for multiple UEs, separate MsgB's may be transmitted by base station 125, addressed to the same RA-RNTI (partitioning). Under the proposed scheme, UE 110 may stop monitoring RA-RNTI upon having completed the RA procedure. Additionally, UE 110 may stop monitoring RA-RNTI upon having received a retransmission request for MsgA. In an event that UE 110 receives a MsgB but has not been addressed in the message (e.g., with the RAPID or the RNTI from MsgA), UE 110 may continue monitoring the physical downlink control channel (PDCCH) for RA-RNTI until the expiry of a window of time for monitoring MsgB (herein referred to as "MsgB window") which is similar to random access response (RAR) window.

Figure 4:
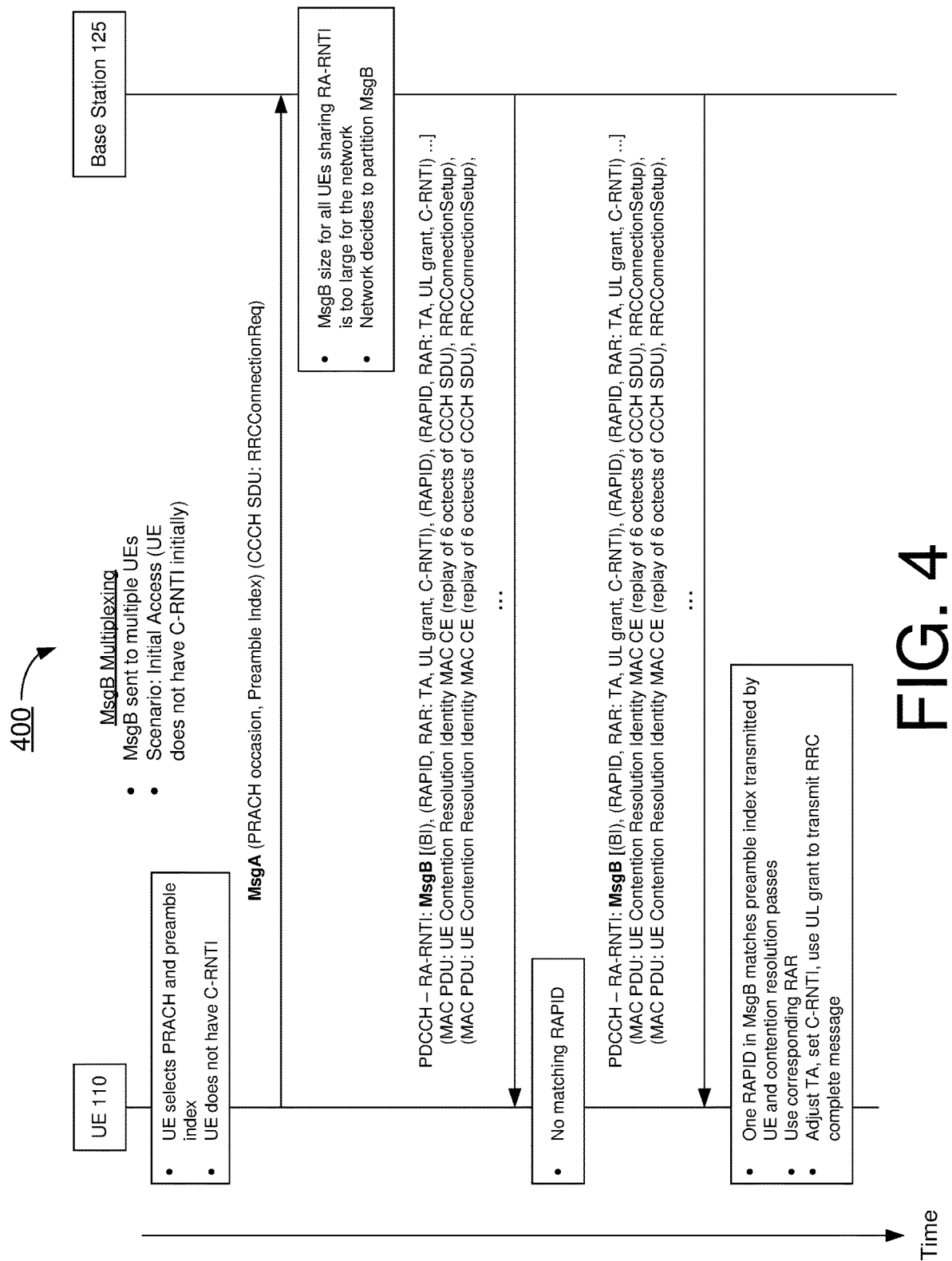
FIG. 4 is a diagram depicting an example scenario in accordance with an implementation of the present disclosure.

Referring to FIG. 4, scenario 400 pertains to MsgB multiplexing in that each MsgB is sent to multiple UEs (e.g., UE 110 and one or more other UEs). Moreover, scenario 400 is a scenario of initial access as UE 110 does not have C-RNTI initially. As shown in FIG. 4, in a two-step RACH under a proposed scheme, UE 110 may select a PRACH and a preamble index and, and UE 110 does not have C-RNTI. UE 110 may then transmit a MsgA to base station 125. In response, as the size of a single MsgB for all the multiple UEs sharing RA-RNTI may be excessively large for wireless network 120, base station 125 may decide to partition MsgB. Accordingly, base station 125 may transmit several MsgB's to UE 110 and the one or more other UEs with the MsgB's addressed to a C-RNTI. UE 110 may monitor the several MsgB's to check if the contention resolution is successful, e.g., if there is a match in RAPID until the RAPID in one of the several MsgB's matches the preamble index transmitted by UE 110 in MsgA. Thus, contention resolution may pass, and UE 110 may perform certain operations. For instance, UE 110 may adjust TA, set C-RNTI, and/or use an UL grant to transmit an RRC complete message. It is noteworthy that, for illustrative purposes and without limitation, some example pieces of information that may be contained in each of MsgA and MsgB are shown in FIG. 4 although less or more information may be carried in MsgA and/or MsgB in various implementations.

Figure 5:
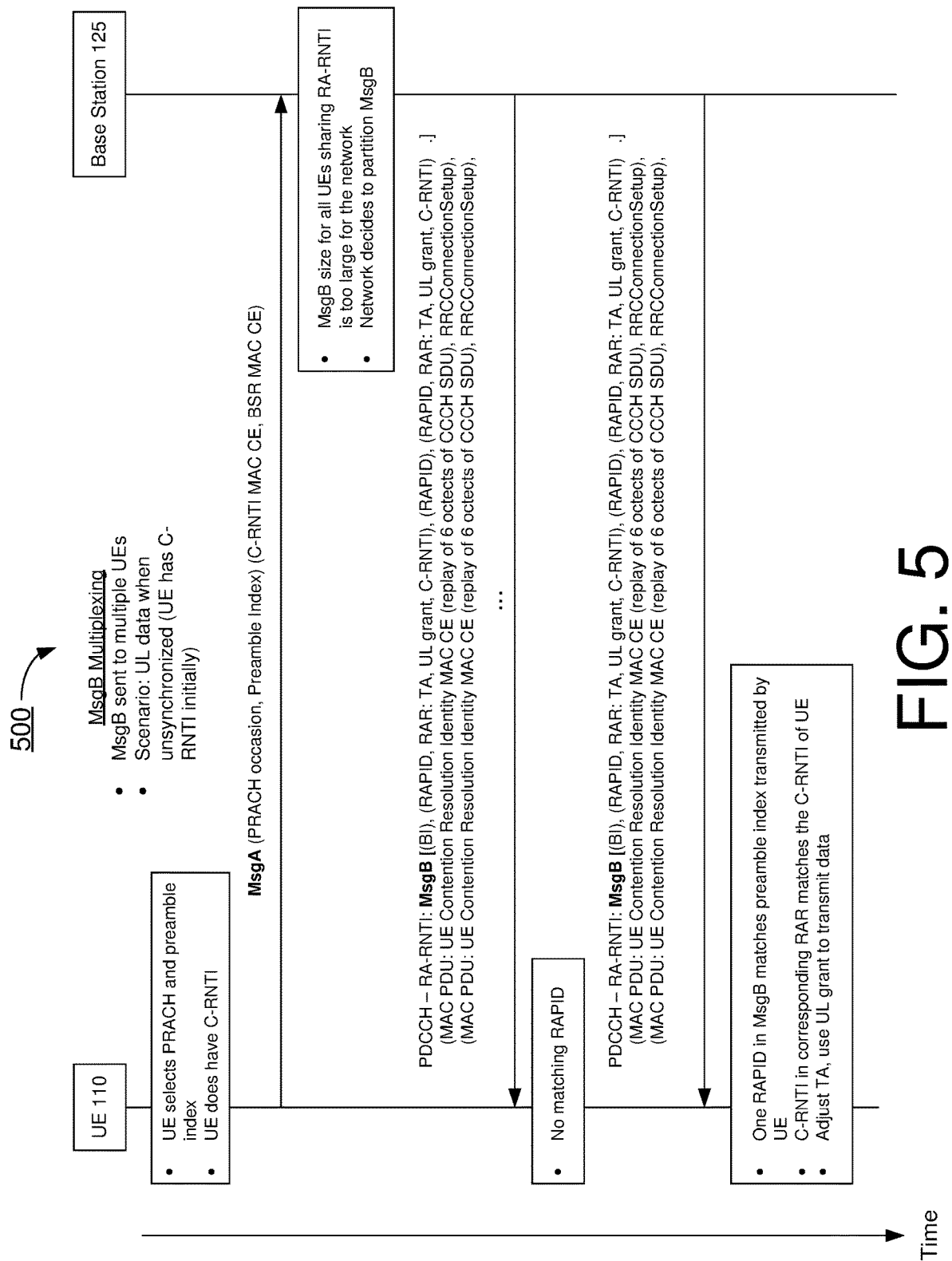
FIG. 5 is a diagram depicting an example scenario in accordance with an implementation of the present disclosure.

Referring to FIG. 5, scenario 500 pertains to MsgB multiplexing in that each MsgB is sent to multiple UEs (e.g., UE 110 and one or more other UEs). Moreover, scenario 500 is a scenario of UL data when unsynchronized with UE 110 having C-RNTI initially. As shown in FIG. 5, in a two-step RACH under a proposed scheme, UE 110 may select a PRACH and a preamble index, and UE 110 does have C-RNTI. UE 110 may then transmit a MsgA to base station 125. MsgA may contain the C-RNTI in a MAC CE. In response, as the size of a single MsgB for all the multiple UEs sharing RA-RNTI may be excessively large for wireless network 120, base station 125 may decide to partition MsgB. Accordingly, base station 125 may transmit several MsgB's to UE 110 and the one or more other UEs with the MsgB's addressed to the C-RNTI. UE 110 may monitor the several MsgB's to check if the contention resolution is successful, e.g., if there is a match in RAPID until the RAPID in one of the several MsgB's matches the preamble index transmitted by UE 110 in MsgA. Moreover, the C-RNTI in the corresponding RAR matches the CRNTI of UE 110. Thus, contention resolution may pass, and UE 110 may perform certain operations. For instance, UE 110 may adjust TA and/or use the UL grant to transmit data. It is noteworthy that, for illustrative purposes and without limitation, some example pieces of information that may be contained in each of MsgA and MsgB are shown in FIG. 5 although less or more information may be carried in MsgA and/or MsgB in various implementations.

It is noteworthy that, in an event that MsgB is partitioned, it may not be possible for wireless network 120 (e.g., base station 125) to indicate a backoff indicator (BI) to back off all UEs that have not completed the RA procedure in the current MsgB. This is because a large MsgB may be in the process of being transmitted for some UEs (partitioned). Under a proposed scheme in accordance with the present disclosure, base station 125 may indicate in MsgB to one or more of the multiple UEs not to back off. For instance, base station 125 may include the RAPIDs of the UE(s) indicated not to back off in a new MsgB payload format. Alternatively, in an event that BI was received in any of the MsgB's and MsgB window expires, the UE(s) not having completed the RA procedure may back off.

Under yet another proposed scheme in accordance with the present disclosure, in a two-step RACH, MsgB may contain information for a single UE (e.g., UE 110) or multiple UEs (e.g., UE 110 and one or more other UEs), depending on the scenario. Under the proposed scheme, MsgB may be addressed to C-RNTI in an event that C-RNTI was available at the start of the RA procedure. Moreover, in an event that C-RNTI was not available, MsgB may be addressed to RA-RNTI. Under the proposed scheme, wireless network 120 (via base station 125) may still choose to address MsgB to RA-RNTI in this case, for example, in order to combine MsgB's for multiple UEs in a single transmission. In an event that C-RNTI was not available, MsgB may be addressed to RA-RNTI. Alternatively, in an event that MsgB is addressed to RA-RNTI (for multiple UEs) and its size becomes excessively large to carry all the information, separate MsgB's may be transmitted by wireless network 120, addressed to the same RA-RNTI (partitioning). Under the proposed scheme, UE 110 may stop monitoring RA-RNTI upon having completed the RA procedure. Additionally, UE 110 may stop monitoring RA-RNTI upon having received a retransmission request for MsgA. In an event that UE 110 receives a MsgB but has not been addressed in that message (e.g., with the RAPID or the RNTI from MsgA), UE 110 may continue monitoring the PDCCH for RA-RNTI until MsgB window expires. Under the proposed scheme, backoff may be handled in a way as that described above.

Figure 6:
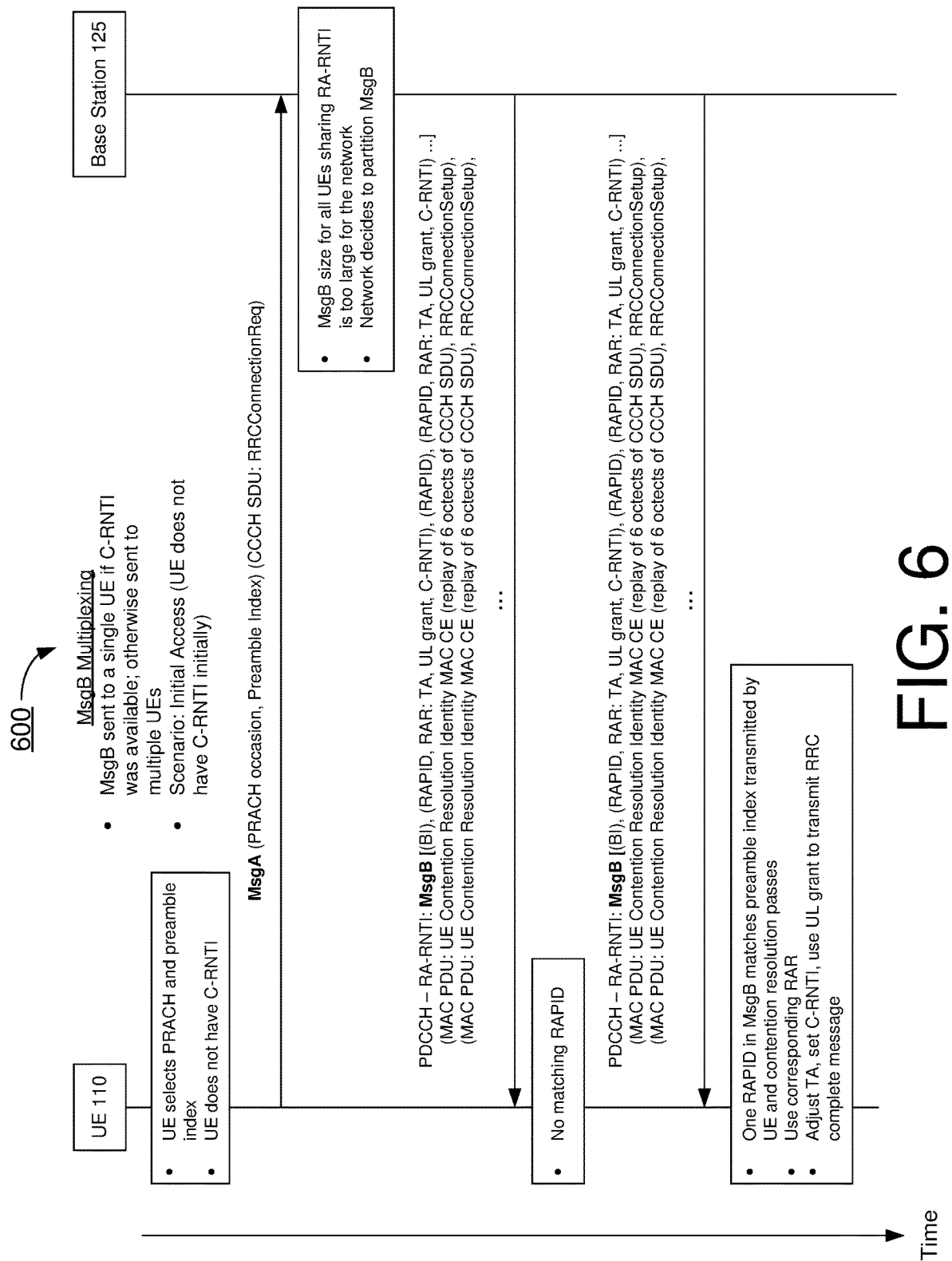
FIG. 6 is a diagram depicting an example scenario in accordance with an implementation of the present disclosure.

Referring to FIG. 6, scenario 600 pertains to MsgB multiplexing in that each MsgB is sent to a single UE (e.g., UE 110) if C-RNTI was available or otherwise to multiple UEs (e.g., UE 110 and one or more other UEs). Moreover, scenario 600 is a scenario of initial access as UE 110 does not have C-RNTI initially. As shown in FIG. 6, in a two-step RACH under a proposed scheme, UE 110 may select a PRACH and a preamble index and, and UE 110 does not have C-RNTI. UE 110 may then transmit a MsgA to base station 125. In response, as the size of a single MsgB for all the multiple UEs sharing RA-RNTI may be excessively large for wireless network 120, base station 125 may decide to partition MsgB. Accordingly, base station 125 may transmit several MsgB's to UE 110 and the one or more other UEs with the MsgB's addressed to a C-RNTI. UE 110 may monitor the several MsgB's to check if the contention resolution is successful, e.g., if there is a match in RAPID until the RAPID in one of the several MsgB's matches the preamble index transmitted by UE 110 in MsgA. Thus, contention resolution may pass, and UE 110 may perform certain operations. For instance, UE 110 may adjust TA, set C-RNTI, and/or use an UL grant to transmit an RRC complete message. It is noteworthy that, for illustrative purposes and without limitation, some example pieces of information that may be contained in each of MsgA and MsgB are shown in FIG. 6 although less or more information may be carried in MsgA and/or MsgB in various implementations.

Figure 7:
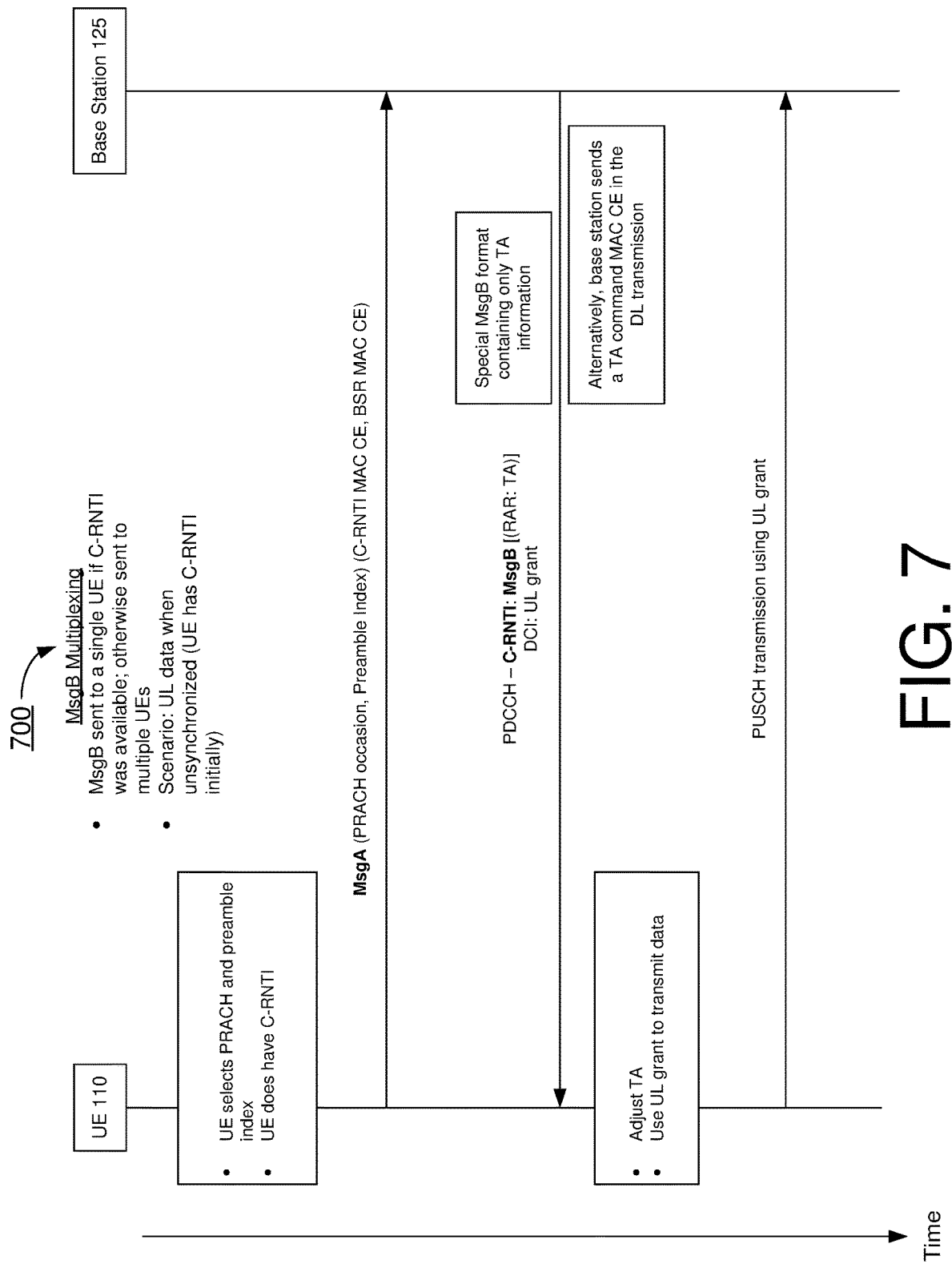
FIG. 7 is a diagram depicting an example scenario in accordance with an implementation of the present disclosure.

Referring to FIG. 7, scenario 700 pertains to MsgB multiplexing in that each MsgB is sent to a single UE (e.g., UE 110) if C-RNTI was available or otherwise to multiple UEs (e.g., UE 110 and one or more other UEs). Moreover, scenario 700 is a scenario of UL data when unsynchronized with UE 110 having C-RNTI initially. As shown in FIG. 7, in a two-step RACH under a proposed scheme, UE 110 may select a PRACH and a preamble index, and UE 110 does have C-RNTI. UE 110 may then transmit a MsgA to base station 125. MsgA may contain the C-RNTI in a MAC CE. In response, base station 125 may transmit a MsgB to UE 110 (and one or more other UEs) with the MsgB addressed to the C-RNTI. MsgB may also contain DCI indicating an UL grant. As an example, MsgB may have a special MsgB format that contains TA information without other information. Alternatively, base station 125 may transmit a TA command MAC CE in a downlink (DL) transmission. Upon receiving MsgB, UE 110 may perform some operations. For instance, UE 110 may adjust TA and/or use the UL grant to transmit data in a PUSCH. It is noteworthy that, for illustrative purposes and without limitation, some example pieces of information that may be contained in each of MsgA and MsgB are shown in FIG. 7 although less or more information may be carried in MsgA and/or MsgB in various implementations.

Under still another proposed scheme in accordance with the present disclosure, in a two-step RACH, in an event that MsgB is addressed to C-RNTI or another unique UE identifier, either of two approaches may be taken. In a first approach, full HARQ may be supported for MsgB. Full HARQ herein may involve HARQ negative acknowledgement (HARQ-NACK) feedback to request retransmission, and the HARQ-NACK may be transmitted in the message part of MsgA (e.g., in a special format). In a second approach, HARQ acknowledgement (HARQ-ACK), but not HARQ-NACK, may be supported for MsgB. Under the proposed scheme, in an event that MsgB is addressed to RA-RNTI, HARQ-ACK may be supported to indicate successful completion of contention resolution to the network. However, HARQ-NACK may not be supported when MsgB is addressed to RA-RNTI.

Figure 8:
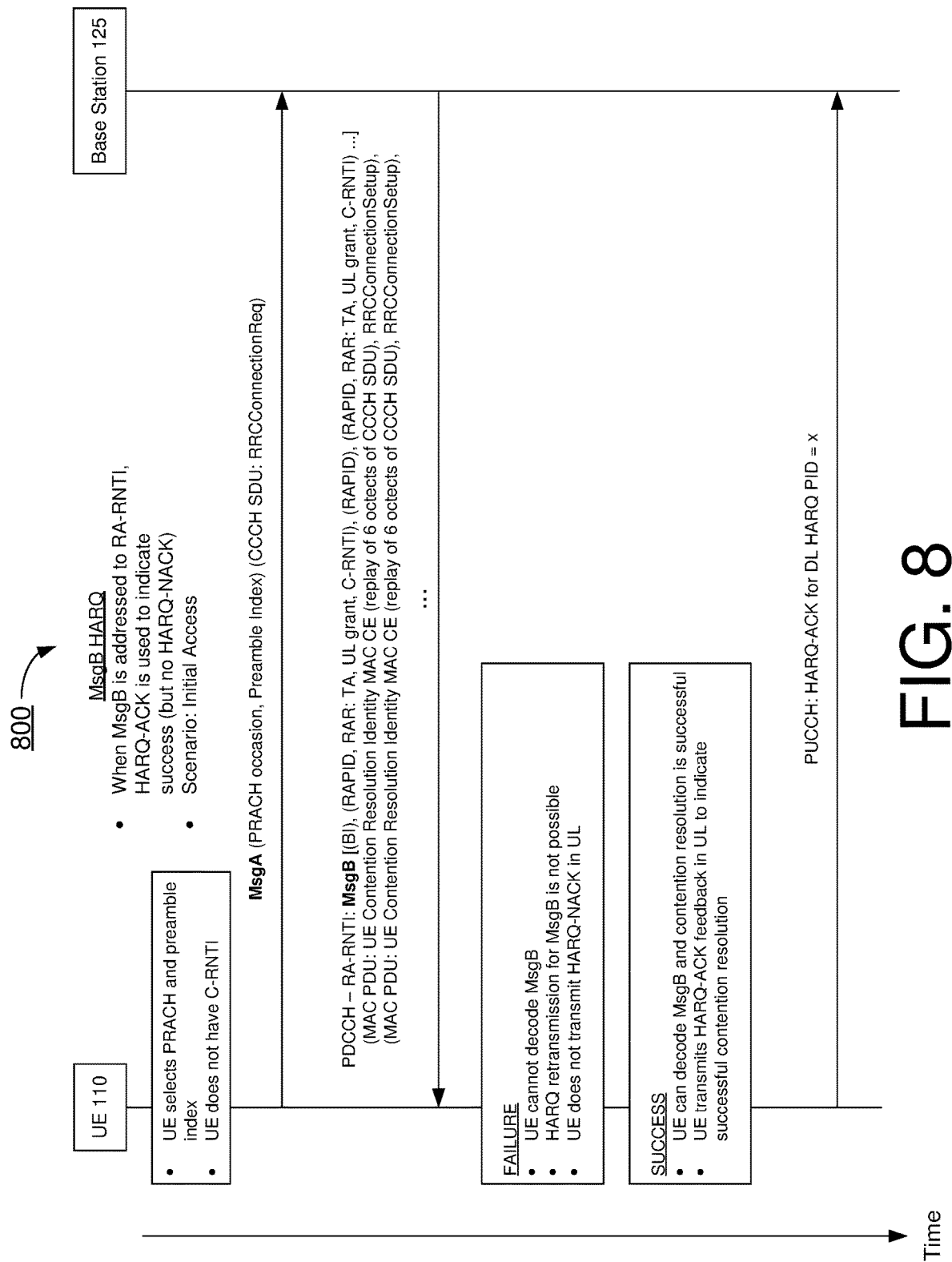
FIG. 8 is a diagram depicting an example scenario in accordance with an implementation of the present disclosure.

Referring to FIG. 8, scenario 800 pertains to HARQ for MsgB with MsgB being addressed to RA-RNTI. Moreover, scenario 800 is a scenario of initial access with HARQ-ACK being used to indicate success and with no HARQ-NACK being used. As shown in FIG. 8, in a two-step RACH under a proposed scheme, UE 110 may select a PRACH and a preamble index and, and UE 110 does not have C-RNTI. UE 110 may then transmit a MsgA to base station 125. In response, base station 125 may transmit to UE 110 a MsgB containing a C-RNTI. In case of failure in decoding MsgB, HARQ retransmission of MsgB is not allowed and, thus, no HARQ-NACK is transmitted by UE 110. In case of success in decoding MsgB and in successful contention resolution, UE 110 may transmit a HARQ-ACK feedback in UL (e.g., physical uplink control channel (PUCCH)) to indicate to base station 125 the successful contention resolution.

Figure 9:
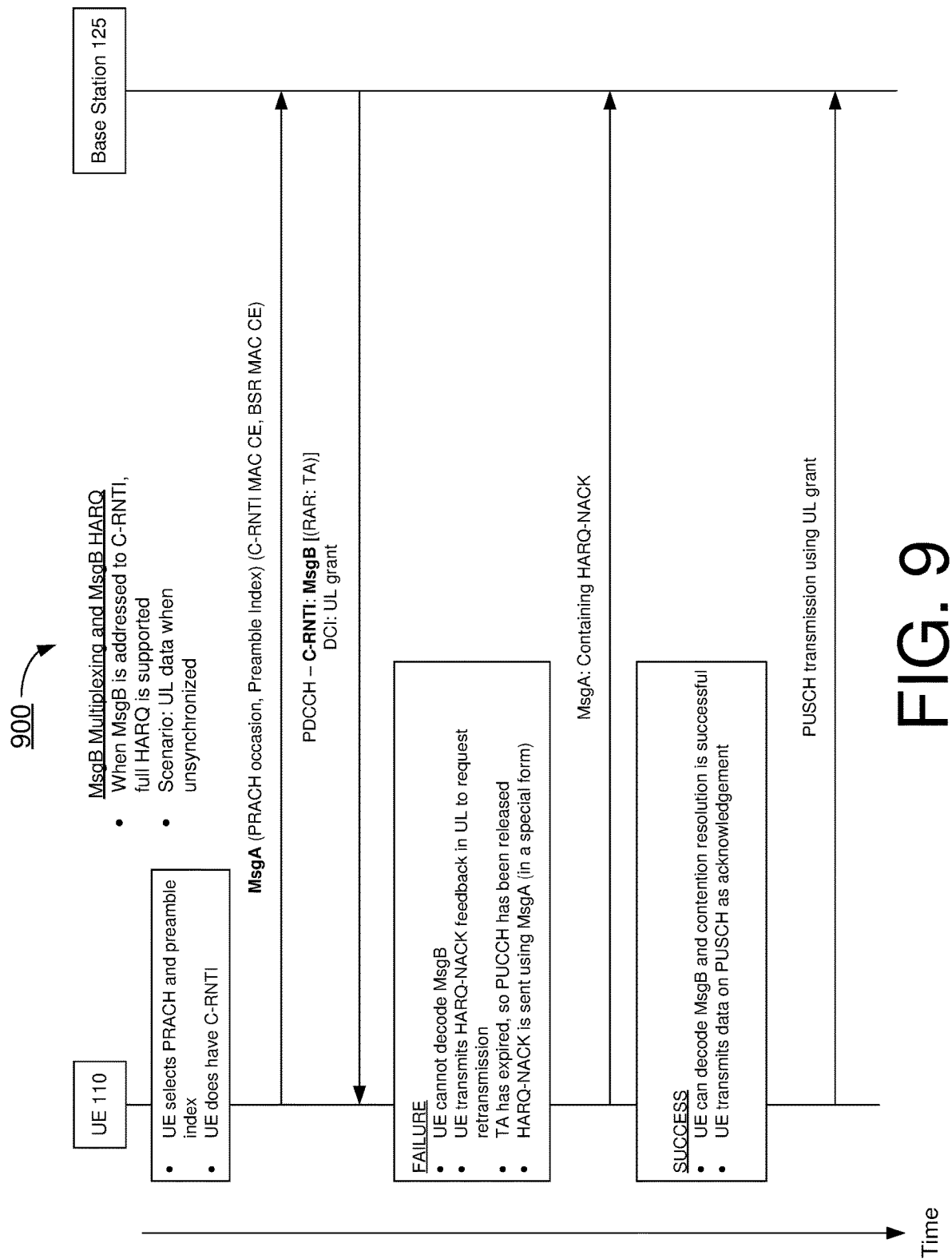
FIG. 9 is a diagram depicting an example scenario in accordance with an implementation of the present disclosure.

Referring to FIG. 9, scenario 900 pertains to HARQ for MsgB multiplexing with MsgB being addressed to C-RNTI. Moreover, scenario 800 is a scenario of UL data when unsynchronized with support for full HARQ. As shown in FIG. 9, in a two-step RACH under a proposed scheme, UE 110 may select a PRACH and a preamble index and, and UE 110 does have C-RNTI. UE 110 may then transmit a MsgA to base station 125 with a MAC CE containing the C-RNTI. In response, base station 125 may transmit to UE 110 a MsgB addressed to the C-RNTI. In case of failure in decoding MsgB, UE 110 may transmit a HARQ-NACK feedback in UL to request retransmission. However, since TA has expired, PUCCH has been released. Accordingly, the HARQ-NACK feedback may be transmitted using MsgA (e.g. in a special format). In case of success in decoding MsgB and in successful contention resolution, UE 110 may transmit data on PUSCH as acknowledgement in lieu of separately transmitting a HARQ-ACK feedback.

In view of the above, various schemes are proposed herein for Msg multiplexing and addressing. Under one proposed scheme, MsgB may be addressed to C-RNTI (if available) or another unique UE identifier (e.g., TU-RNTI) and may contain information for a single UE. Under another proposed scheme, MsgB may be addressed to RA-RNTI and may contain information for one or more UEs. In an event that MsgB size is excessively large, such a large MsgB may be partitioned into multiple smaller MsgB's sharing the same RA-RNTI. Accordingly, the UE(s) that have not been addressed in one of the MsgB's may continue monitoring PDCCH for RA-RNTI until RAR window (or MsgB window) expires. Moreover, the network may indicate which UE(s) should continue monitoring RA-RNTI in case that backoff is required for other (remaining) UE(s).

Under yet another proposed scheme, MsgB may be addressed to C-RNTI or another unique UE identifier if available before the RA procedure; otherwise MsgB may be addressed to RA-RNTI. In an event that MsgB is addressed to C-RNTI or a unique UE identifier, then MsgB may contain information for a single UE. In an event that MsgB is addressed to RA-RNTI, then MsgB may contain information for one or more UEs and may be partitioned (e.g., if the size thereof would be excessively large without partitioning). It is noteworthy that, when a unique UE identifier (e.g., C-RNTI) is available, it may be up to the network to address MsgB to the unique UE identifier (e.g., C-RNTI) or RA-RNTI.

Moreover, various schemes are proposed herein for Msg HARQ. Under one proposed scheme, in an event that MsgB is addressed to C-RNTI or another unique UE identifier, either of two approaches may be taken. In one approach, full HARQ functionality may be supported in that HARQ- NACK may be transmitted by the UE in MsgA. In another approach, HARQ-ACK (but not HARQ-NACK) may be supported in that HARQ-ACK may be used to indicate successful contention resolution. Under another proposed scheme, in an event that MsgB is addressed to RA-RNTI, HARQ-ACK (but not HARQ-NACK) may be supported in that HARQ-ACK may be used to indicate successful contention resolution.

Illustrative Implementations

Figure 10:
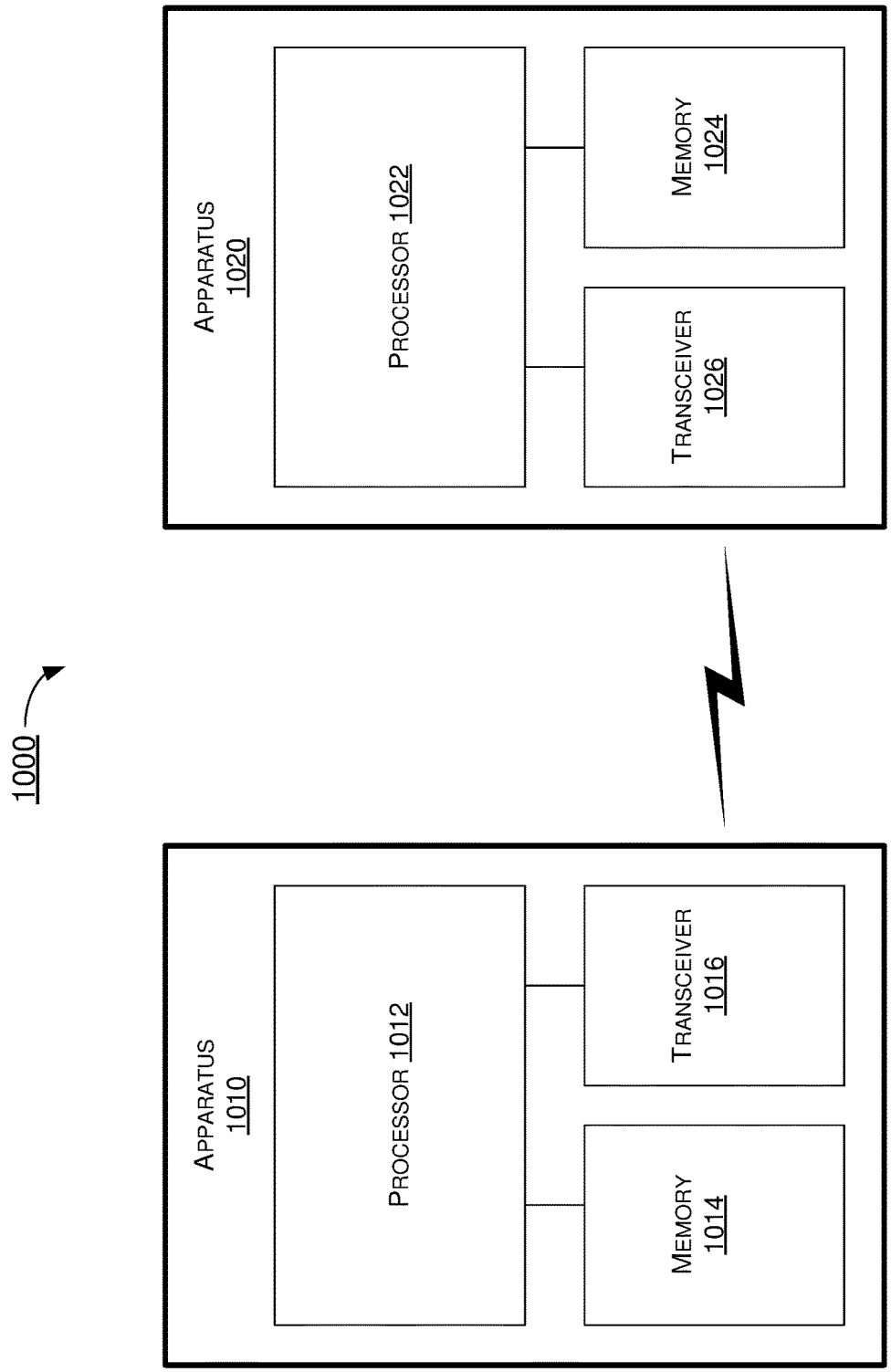
FIG. 10 is a block diagram of an example communication system in accordance with an implementation of the present disclosure.

FIG. 10 illustrates an example communication system 1000 having an example apparatus 1010 and an example apparatus 1020 in accordance with an implementation of the present disclosure. Each of apparatus 1010 and apparatus 1020 may perform various functions to implement schemes, techniques, processes and methods described herein pertaining to multiplexing, addressing and HARQ for MsgB in two-step RACH in mobile communications, including various schemes described above as well as processes described below.

Each of apparatus 1010 and apparatus 1020 may be a part of an electronic apparatus, which may be a UE such as a vehicle, a portable or mobile apparatus, a wearable apparatus, a wireless communication apparatus or a computing apparatus. For instance, each of apparatus 1010 and apparatus 1020 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 1010 and apparatus 1020 may also be a part of a machine type apparatus, which may be an IoT or NB-IoT apparatus such as an immobile or a stationary apparatus, a home apparatus, a wire communication apparatus or a computing apparatus. For instance, each of apparatus 1010 and apparatus 1020 may be implemented in a smart thermostat, a smart fridge, a smart door lock, a wireless speaker or a home control center. Alternatively, each of apparatus 1010 and apparatus 1020 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 1010 and apparatus 1020 may include at least some of those components shown in FIG. 10 such as a processor 1012 and a processor 1022, respectively. Each of apparatus 1010 and apparatus 1020 may further include one or more other components not pertinent to the proposed scheme of the present disclosure (e.g., internal power supply, display device and/or user interface device), and, thus, such component(s) of each of apparatus 1010 and apparatus 1020 are neither shown in FIG. 10 nor described below in the interest of simplicity and brevity.

In some implementations, at least one of apparatus 1010 and apparatus 1020 may be a part of an electronic apparatus, which may be a vehicle, a roadside unit (RSU), network node or base station (e.g., eNB, gNB or TRP), a small cell, a router or a gateway. For instance, at least one of apparatus 1010 and apparatus 1020 may be implemented in a vehicle in a vehicle-to-vehicle (V2V) or V2X network, an eNodeB in an LTE, LTE-Advanced or LTE-Advanced Pro network or in a gNB in a 5G, NR, IoT or NB-IoT network. Alternatively, at least one of apparatus 1010 and apparatus 1020 may be implemented in the form of one or more IC chips such as, for example and without limitation, one or more single-core processors, one or more multi-core processors, or one or more CISC or RISC processors.

In one aspect, each of processor 1012 and processor 1022 may be implemented in the form of one or more single-core processors, one or more multi-core processors, or one or more CISC or RISC processors. That is, even though a singular term "a processor" is used herein to refer to processor 1012 and processor 1022, each of processor 1012 and processor 1022 may include multiple processors in some implementations and a single processor in other implementations in accordance with the present disclosure. In another aspect, each of processor 1012 and processor 1022 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1012 and processor 1022 is a special-purpose machine specifically designed, arranged and configured to perform specific tasks including multiplexing, addressing and HARQ for MsgB in two-step RACH in mobile communications in accordance with various implementations of the present disclosure.

In some implementations, apparatus 1010 may also include a transceiver 1016, as a communication device, coupled to processor 1012 and capable of wirelessly transmitting and receiving data. In some implementations, apparatus 1010 may further include a memory 1014 coupled to processor 1012 and capable of being accessed by processor 1012 and storing data therein. In some implementations, apparatus 1020 may also include a transceiver 1026, as a communication device, coupled to processor 1022 and capable of wirelessly transmitting and receiving data. In some implementations, apparatus 1020 may further include a memory 1024 coupled to processor 1022 and capable of being accessed by processor 1022 and storing data therein. Accordingly, apparatus 1010 and apparatus 1020 may wirelessly communicate with each other via transceiver 1016 and transceiver 1026, respectively.

To aid better understanding, the following description of the operations, functionalities and capabilities of each of apparatus 1010 and apparatus 1020 is provided in the context of an NR communication environment in which apparatus 1010 is implemented in or as a wireless communication device, a communication apparatus or a UE (e.g., UE 110) and apparatus 1020 is implemented in or as a network node (e.g., base station 125 of wireless network 120).

In one aspect of multiplexing, addressing and HARQ for MsgB in two-step RACH in mobile communications in accordance with the present disclosure, processor 1012 of apparatus 1010, implemented in a UE (e.g., UE 110) may transmit, via transceiver 1016, to apparatus 1020 as a network node (e.g., base station 125) of a wireless network (e.g., wireless network 120) a first message containing a preamble index and data. Additionally, processor 1012 may receive, via transceiver 1016 responsive to transmitting the first message, from the network node a second message containing a RAR and contention resolution information. The second message may be addressed to either a C-RNTI of the UE or a RA-RNTI.

In some implementations, the second message may be addressed to the C-RNTI of the UE responsive to both the C-RNTI being indicated in the first message and the second message being transmitted to the UE and no other UE.

In some implementations, the second message may be addressed to the RA-RNTI responsive to either the C-RNTI being absent in the first message or the second message being transmitted to the UE and one or more other UEs.

In some implementations, in receiving the second message, processor 1012 may receive one or more partitions of a plurality of partitions of the second message that are addressed to the RA-RNTI.

In some implementations, in receiving the one or more partitions of the plurality of partitions of the second message, processor 1012 may perform some operations. For instance, processor 1012 may monitor a PDCCH for at least the one or more partitions of the plurality of partitions of the second message. Moreover, processor 1012 may stop to monitor the PDCCH in an event that at least one of a plurality of conditions is met. In some implementations, the plurality of conditions may include the following: (a) the UE having completed the RA procedure; (b) the UE having received a retransmission request for the first message; (c) the UE having been addressed in the one or more partitions of the plurality of partitions of the second message with a RAPID or a RNTI from the first message (e.g., the C-RNTI of the UE or the RA-RNTI); and (d) expiration of a window of time for the monitoring.

In some implementations, with the second message being addressed to the C-RNTI of the UE or another unique ID of the UE, processor 1012 may further transmit, via transceiver 1016, a HARQ-NACK feedback to the network node to indicate failure in decoding the second message. In some implementations, in transmitting the HARQ-NACK feedback, processor 1012 may transmit the HARQ-NACK in a message part of a message formatted as the first message (MsgA).

In some implementations, with the second message being addressed to the C-RNTI of the UE or another unique ID of the UE, processor 1012 may further transmit, via transceiver 1016, a HARQ-ACK feedback to the network node to indicate success in decoding the second message. In such cases, no HARQ-NACK feedback may be transmitted to the network node responsive to failure in decoding the second message.

In some implementations, with the second message being addressed to the RA-RNTI, processor 1012 may further transmit, via transceiver 1016, a HARQ-ACK feedback to the network node to indicate success in completion of the contention resolution. In such cases, no HARQ-NACK feedback may be transmitted to the network node responsive to failure in the completion of the contention resolution.

Illustrative Processes

Figure 11:
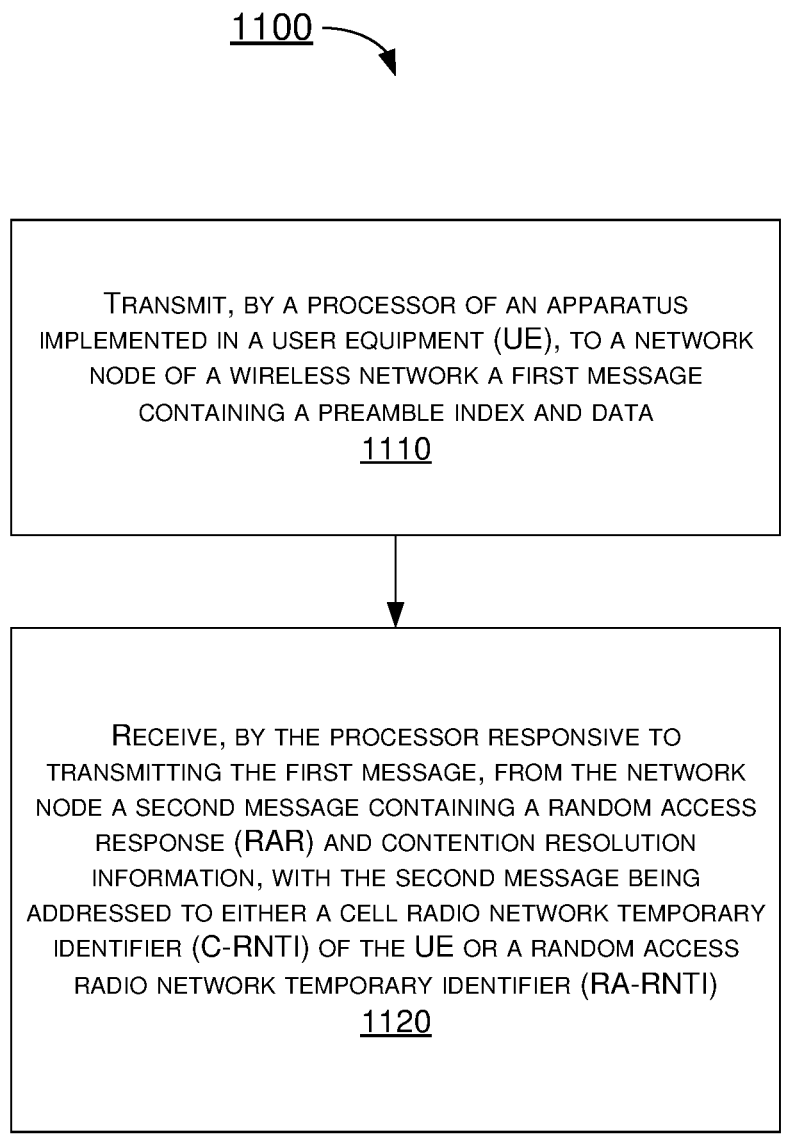
FIG. 11 is a flowchart of an example process in accordance with an implementation of the present disclosure.
Figure 13:
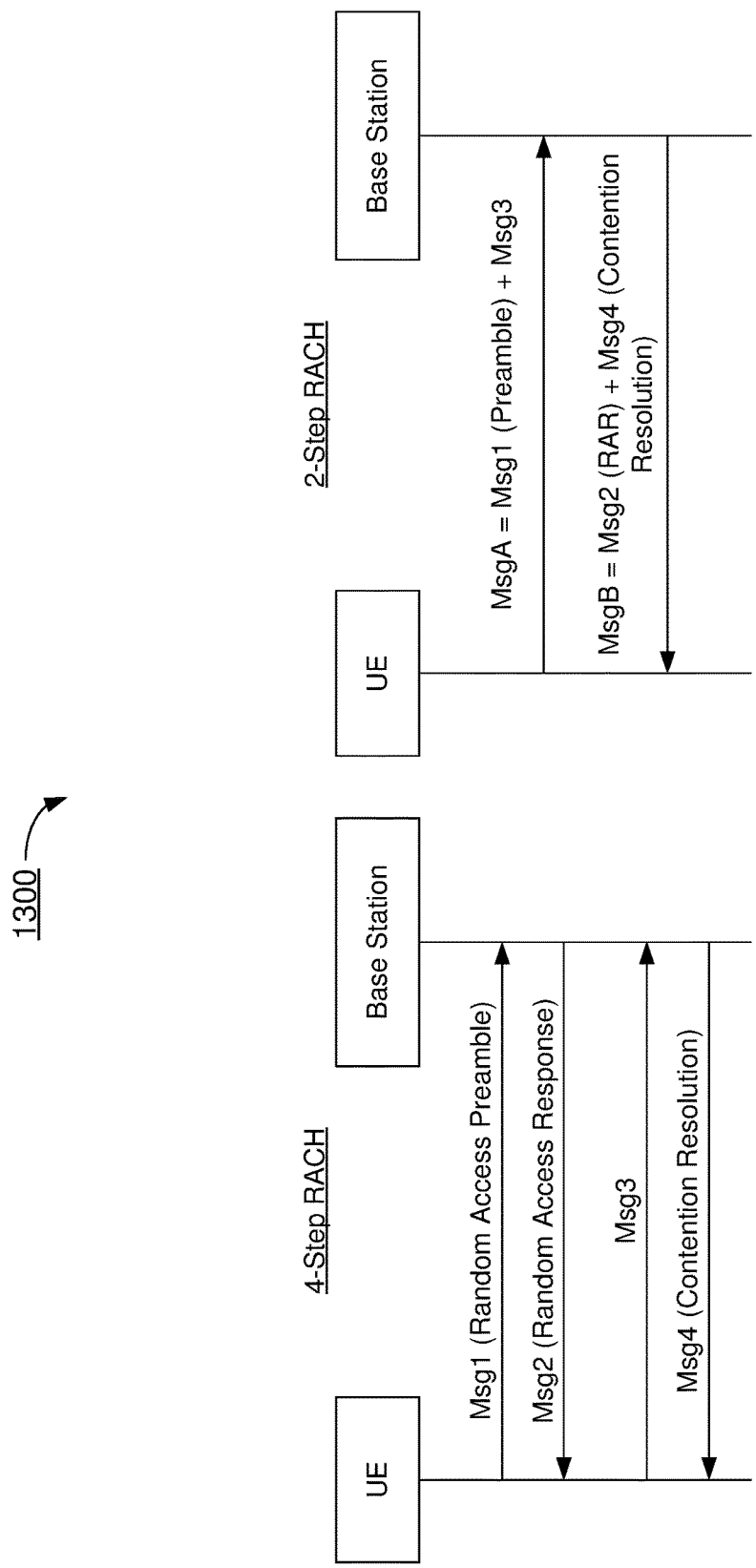
FIG. 13 is a diagram of a four-step RACH and a two-step RACH.

FIG. 11 illustrates an example process 1100 in accordance with an implementation of the present disclosure. Process 1100 may be an example implementation of the proposed schemes described above with respect to multiplexing, addressing and HARQ for MsgB in two-step RACH in mobile communications in accordance with the present disclosure. Process 1100 may represent an aspect of implementation of features of apparatus 1010 and apparatus 1020. Process 1100 may include one or more operations, actions, or functions as illustrated by one or more of blocks 1110 and 1120. Although illustrated as discrete blocks, various blocks of process 1100 may be divided into additional blocks, combined into fewer blocks, or eliminated, depending on the desired implementation. Moreover, the blocks of process 1100 may be executed in the order shown in FIG. 11 or, alternatively, in a different order. Process 1100 may also be repeated partially or entirely. Process 1100 may be implemented by apparatus 1010, apparatus 1020 and/or any suitable wireless communication device, UE, RSU, base station or machine type devices. Solely for illustrative purposes and without limitation, process 1100 is described below in the context of apparatus 1010 as a UE (e.g., first UE 110) and apparatus 1020 as a network node (e.g., base station 125 of wireless network 120). Process 1100 may begin at block 1110.

At 1110, process 1100 may involve processor 1012 of apparatus 1010, implemented in a UE (e.g., UE 110), transmitting, via transceiver 1016, to apparatus 1020 as a network node (e.g., base station 125) of a wireless network (e.g., wireless network 120) a first message containing a preamble index and data. Process 1100 may proceed from 1110 to 1120.

At 1120, process 1100 may involve processor 1012 receiving, via transceiver 1016 responsive to transmitting the first message, from the network node a second message containing a RAR and contention resolution information. The second message may be addressed to either a C-RNTI of the UE or a RA-RNTI.

In some implementations, the second message may be addressed to the C-RNTI of the UE responsive to both the C-RNTI being indicated in the first message and the second message being transmitted to the UE and no other UE.

In some implementations, the second message may be addressed to the RA-RNTI responsive to either the C-RNTI being absent in the first message or the second message being transmitted to the UE and one or more other UEs.

In some implementations, in receiving the second message, process 1100 may involve processor 1012 receiving one or more partitions of a plurality of partitions of the second message that are addressed to the RA-RNTI.

In some implementations, in receiving the one or more partitions of the plurality of partitions of the second message, process 1100 may involve processor 1012 performing some operations. For instance, process 1100 may involve processor 1012 monitoring a PDCCH for at least the one or more partitions of the plurality of partitions of the second message. Moreover, process 1100 may involve processor 1012 stopping to monitor the PDCCH in an event that at least one of a plurality of conditions is met. In some implementations, the plurality of conditions may include the following: (a) the UE having completed the RA procedure; (b) the UE having received a retransmission request for the first message; (c) the UE having been addressed in the one or more partitions of the plurality of partitions of the second message with a RAPID or a RNTI from the first message (e.g., the C-RNTI of the UE or the RA-RNTI); and (d) expiration of a window of time for the monitoring.

In some implementations, with the second message being addressed to the C-RNTI of the UE or another unique ID of the UE, process 1100 may further involve processor 1012 transmitting, via transceiver 1016, a HARQ-NACK feedback to the network node to indicate failure in decoding the second message. In some implementations, in transmitting the HARQ-NACK feedback, process 1100 may involve processor 1012 transmitting the HARQ-NACK in a message part of a message formatted as the first message (MsgA).

In some implementations, with the second message being addressed to the C-RNTI of the UE or another unique ID of the UE, process 1100 may further involve processor 1012 transmitting, via transceiver 1016, a HARQ-ACK feedback to the network node to indicate success in decoding the second message. In such cases, no HARQ-NACK feedback may be transmitted to the network node responsive to failure in decoding the second message.

In some implementations, with the second message being addressed to the RA-RNTI, process 1100 may further involve processor 1012 transmitting, via transceiver 1016, a HARQ-ACK feedback to the network node to indicate success in completion of the contention resolution. In such cases, no HARQ-NACK feedback may be transmitted to the network node responsive to failure in the completion of the contention resolution.

FIG. 12 illustrates an example process 1200 in accordance with an implementation of the present disclosure. Process 1200 may be an example implementation of the proposed schemes described above with respect to multiplexing, addressing and HARQ for MsgB in two-step RACH in mobile communications in accordance with the present disclosure. Process 1200 may represent an aspect of implementation of features of apparatus 1010 and apparatus 1020. Process 1200 may include one or more operations, actions, or functions as illustrated by one or more of blocks 1210 and 1220. Although illustrated as discrete blocks, various blocks of process 1200 may be divided into additional blocks, combined into fewer blocks, or eliminated, depending on the desired implementation. Moreover, the blocks of process 1200 may executed in the order shown in FIG. 12 or, alternatively, in a different order. Process 1200 may also be repeated partially or entirely. Process 1200 may be implemented by apparatus 1010, apparatus 1020 and/or any suitable wireless communication device, UE, RSU, base station or machine type devices. Solely for illustrative purposes and without limitation, process 1200 is described below in the context of apparatus 1010 as a UE (e.g., first UE 110) and apparatus 1020 as a network node (e.g., base station 125 of wireless network 120). Process 1200 may begin at block 1210.

At 1210, process 1200 may involve processor 1012 of apparatus 1010, implemented in a UE (e.g., UE 110), transmitting, via transceiver 1016, to apparatus 1020 as a network node (e.g., base station 125) of a wireless network (e.g., wireless network 120) a first message containing a preamble index and data. Process 1200 may proceed from 1210 to 1220.

At 1220, process 1200 may involve processor 1012 receiving, via transceiver 1016 responsive to transmitting the first message, from the network node a second message containing a RAR and contention resolution information. In some implementations, the second message may be addressed to a C-RNTI of the UE responsive to both the C-RNTI being indicated in the first message and the second message being transmitted to the UE and no other UE. The second message may be addressed to a RA-RNTI responsive to either the C-RNTI being absent in the first message or the second message being transmitted to the UE and one or more other UEs.

In some implementations, in receiving the second message, process 1200 may involve processor 1012 receiving one or more partitions of a plurality of partitions of the second message that are addressed to the RA-RNTI.

In some implementations, in receiving the one or more partitions of the plurality of partitions of the second message, process 1200 may involve processor 1012 performing some operations. For instance, process 1200 may involve processor 1012 monitoring a PDCCH for at least the one or more partitions of the plurality of partitions of the second message. Moreover, process 1200 may involve processor 1012 stopping to monitor the PDCCH in an event that at least one of a plurality of conditions is met.

In some implementations, the plurality of conditions may include the following: (a) the UE having completed the RA procedure; (b) the UE having received a retransmission request for the first message; (c) the UE having been addressed in the one or more partitions of the plurality of partitions of the second message with a RAPID or a RNTI from the first message (e.g., the C-RNTI of the UE or the RA-RNTI); and (d) expiration of a window of time for the monitoring.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations.

Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method of a two-step random access (RA) procedure in New Radio (NR) mobile communications, comprising:
   transmitting, by a processor of an apparatus implemented in a user equipment (UE), to a network node of a wireless network a first message containing data; and
   receiving, by the processor responsive to transmitting the first message, from the network node a second message containing a random access response (RAR) and contention resolution information,
   wherein the second message is addressed to a shared radio network temporary identifier (RNTI) responsive to a cell radio network temporary identifier (C-RNTI) being absent in the first message,
   wherein the receiving of the second message comprises:
      monitoring a physical downlink control channel (PDCCH) for the second message; and
      stopping to monitor the PDCCH in an event of the UE having received a retransmission request.

2. The method of claim 1, wherein the receiving of the second message comprises receiving one or more partitions of a plurality of partitions of the second message that are addressed to the shared RNTI which comprises a random access RNTI (RA-RNTI).

3. The method of claim 2, wherein the receiving of the one or more partitions of the plurality of partitions of the second message comprises:
   monitoring a physical downlink control channel (PDCCH) for at least the one or more partitions of the plurality of partitions of the second message; and
   stopping to monitor the PDCCH in an event that at least one of a plurality of conditions is met.

4. The method of claim 3, wherein the plurality of conditions comprise:
   the UE having completed the RA procedure;
   the UE having received a retransmission request;
   the UE having been addressed in the one or more partitions of the plurality of partitions of the second message with a random access preamble identifier (RAPID) or a radio network temporary identifier (RNTI) from the first message; and
   expiration of a window of time for the monitoring.

5. The method of claim 1, with the second message being addressed to the C-RNTI of the UE or another unique identifier (ID) of the UE, further comprising:
   transmitting, by the processor, a hybrid automatic repeat request negative acknowledgement (HARQ-NACK) feedback to the network node to indicate failure in decoding the second message.

6. The method of claim 5, with the transmitting of the HARQ-NACK feedback comprises transmitting the HARQ-NACK in a message part of a message formatted as the first message.

7. The method of claim 1, with the second message being addressed to the C-RNTI of the UE or another unique identifier (ID) of the UE, further comprising:
   transmitting, by the processor, a hybrid automatic repeat request acknowledgement (HARQ-ACK) feedback to the network node to indicate success in decoding the second message,
   wherein no hybrid automatic repeat request negative acknowledgement (HARQ-NACK) feedback is transmitted to the network node responsive to failure in decoding the second message.

8. The method of claim 1, with the second message being addressed to the shared RNTI, further comprising:
   transmitting, by the processor, a hybrid automatic repeat request acknowledgement (HARQ-ACK) feedback to the network node to indicate success in completion of the contention resolution,
   wherein no hybrid automatic repeat request negative acknowledgement (HARQ-NACK) feedback is transmitted to the network node responsive to failure in the completion of the contention resolution.

9. A method of a two-step random access (RA) procedure in New Radio (NR) mobile communications, comprising:
   transmitting, by a processor of an apparatus implemented in a user equipment (UE), to a network node of a wireless network a first message containing data;
   receiving, by the processor responsive to transmitting the first message, from the network node a second message containing a random access response (RAR) and contention resolution information; and
   stopping, by the processor, monitoring a shared radio network temporary identifier (RNTI) responsive to receiving a retransmission request,
   wherein the second message is addressed to a cell radio network temporary identifier (C-RNTI) of the UE responsive to:
      the C-RNTI being indicated in the first message; and
      the second message being transmitted to the UE and no other UE, and
   wherein the second message is addressed to the shared RNTI responsive to the C-RNTI being absent in the first message,
   wherein the receiving of the second message comprises receiving one or more partitions of a plurality of partitions of the second message that are addressed to the shared RNTI which comprises a random access radio network temporary identifier (RA-RNTI),
   wherein the receiving of the one or more partitions of the plurality of partitions of the second message comprises:

monitoring a physical downlink control channel (PDCCH) for at least the one or more partitions of the plurality of partitions of the second message; and stopping to monitor the PDCCH in an event that at least one of a plurality of conditions is met, and wherein the plurality of conditions comprise:

the UE having received the retransmission request; and the UE having been addressed in the one or more partitions of the plurality of partitions of the second message with a random access preamble identifier (RAPID) or a radio network temporary identifier (RNTI) from the first message.

10. The method of claim 9, wherein the plurality of conditions further comprise:

the UE having completed the RA procedure; and expiration of a window of time for the monitoring.

11. An apparatus implementable in a user equipment (UE), comprising:

a transceiver configured to wirelessly communicate with a network node of a wireless network;

a processor coupled to the transceiver and configured to perform operations comprising:

transmitting, via the transceiver, to the network node a first message containing data;

receiving, via the transceiver responsive to transmitting the first message, from the network node a second message containing a random access response (RAR) and contention resolution information; and stopping monitoring a shared radio network temporary identifier (RNTI) responsive to receiving a retransmission request, wherein the second message is addressed to the shared RNTI responsive to a cell radio network temporary identifier (C-RNTI) being absent in the first message, wherein, in receiving the second message, the processor is configured to receive one or more partitions of a plurality of partitions of the second message that are addressed to the shared RNTI by:

monitoring a physical downlink control channel (PDCCH) for at least the one or more partitions of the plurality of partitions of the second message; and stopping to monitor the PDCCH in an event that at least one of a plurality of conditions is met, and wherein the plurality of conditions comprise:

the UE having received the retransmission request; and the UE having been addressed in the one or more partitions of the plurality of partitions of the second message with a random access preamble identifier (RAPID) or a radio network temporary identifier (RNTI) from the first message.

12. The apparatus of claim 11, wherein the second message is addressed to the C-RNTI of the UE responsive to both the C-RNTI being indicated in the first message and the second message being transmitted to the UE and no other UE, and wherein the second message is addressed to the shared RNTI responsive to either the C-RNTI being absent in the first message.

13. The apparatus of claim 11, wherein the plurality of conditions further comprise:

the UE having completed the RA procedure; and expiration of a window of time for the monitoring.

14. The apparatus of claim 11, with the second message being addressed to the C-RNTI of the UE or another unique identifier (ID) of the UE, the processor is further configured to perform operations comprising:

transmitting, via the transceiver, a hybrid automatic repeat request negative acknowledgement (HARQ-NACK) feedback to the network node to indicate failure in decoding the second message.

15. The apparatus of claim 11, with the second message being addressed to the C-RNTI of the UE or another unique identifier (ID) of the UE, the processor is further configured to perform operations comprising:

transmitting, via the transceiver, a hybrid automatic repeat request acknowledgement (HARQ-ACK) feedback to the network node to indicate success in decoding the second message, wherein no hybrid automatic repeat request negative acknowledgement (HARQ-NACK) feedback is transmitted to the network node responsive to failure in decoding the second message.

16. The apparatus of claim 11, with the second message being addressed to the shared RNTI, the processor is further configured to perform operations comprising:

transmitting, via the transceiver, a hybrid automatic repeat request acknowledgement (HARQ-ACK) feedback to the network node to indicate success in completion of the contention resolution, wherein no hybrid automatic repeat request negative acknowledgement (HARQ-NACK) feedback is transmitted to the network node responsive to failure in the completion of the contention resolution.

* * * * *